United States Patent [19]

Overby

[11] 4,005,306
[45] Jan. 25, 1977

[54] FLUX BREAKER FOR SUBMERGED ARC STRIP CLADDING OF METALLIC WORK PIECES

[75] Inventor: Clarence Winfred Overby, Rossville, Ga.

[73] Assignee: Combustion Engineering, Inc., Windsor, Conn.

[22] Filed: July 17, 1975

[21] Appl. No.: 596,876

[52] U.S. Cl. .............................. 219/76; 219/73 R
[51] Int. Cl.² .......................................... B23K 9/04
[58] Field of Search ........... 219/73 R, 76, 123, 128

[56] References Cited

UNITED STATES PATENTS 3,493,713  2/1970  Johnson .......................... 219/73 R

*Primary Examiner*—E. A. Goldberg
*Attorney, Agent, or Firm*—Frederick A. Goettel, Jr.; Richard H. Berneike

[57] ABSTRACT

The invention relates to an improvement in apparatus for carrying out the submerged arc surfacing of metallic work pieces with metal electrode strips melting in an electric arc while forming welding beads upon the work piece. A slag breaker comprising a series of parallel plate portions disposed substantially perpendicular to the surface of the electrode strip is positioned on the leading side of the electrode strip adjacent the region of the electric arc. The slag breaker serves to break up an accumulation of fused flux particles which tend to form a sheet in front of the welding arc which, if permitted to form would block the flux feed into the welding arc on the leading side. The slag breaker thus serves to prohibit formation of such a sheet and thereby permits uniform flow of flux to insure complete submergence of the arc in the flux material thus minimizing the chance of the arc flashing through the flux burden and resulting in defects in the deposited cladding material.

3 Claims, 12 Drawing Figures

FLUX BREAKER FOR SUBMERGED ARC STRIP CLADDING OF METALLIC WORK PIECES

BACKGROUND OF THE INVENTION

1. Field of the Invention

This invention relates to an improved method for submerged arc overlay welding of metallic work pieces with metal strips melting in an electric arc while submerged in a layer of granular welding flux.

2. Description of the Prior Art

Heretofore, it has been known to plate or clad various members or work pieces by establishing an electric arc between the work piece and a plating material such as a metal strip and by melting the strip in the arc so as to deposit the melted material of the strip on the work piece. It is also known to move the work piece relative to the plating material so as to deposit the melted material in a generally linear plating zone. Such weld cladding is generally performed by the submerged arc process whereby the electric arc and the molten metal are entirely covered by a layer of a suitable weld flux material. A typical application of such a cladding method would be to clad the interior surface of a cylindrical vessel with a corrosion resistant alloy such as stainless steel. Such a cladding operation would be carried out by positioning the welding head adjacent one end of the interior of the vessel to be clad and then simultaneously rotating and linearly translating the vessel so that the resulting weld bead would form a spiral pattern with adjacent weld beads overlapping one another so that they form a substantially uniform thickness covering on the interior surface of the vessel.

Numerous problems have been encountered in developing a technique which permits the deposition of a high quality clad surface using such a strip electrode as the source of cladding material. When the term strip is used herein it is meant to refer to any source of welding material wherein the strip width is substantially greater than the thickness of the strip, typical such strips are in the order of 2 to 6 inches wide and 0.020 to 0.035 of an inch in thickness. Included among the numerous problems encountered are the following: achieving a uniform thickness weld deposit; achieving a substantially void free weld deposit; achieving an acceptable rate of coverage; and, a particularly perplexing problem has been the inability to achieve a void free tie-in between adjacent weld beads having a thickness at least as great as the weld beads themselves. The inability to achieve a satisfactory tie-in between adjacent weld beads often leads to the need to go back and deposit a supplementary quantity of weld material in this region of the clad surface. Such a course is, of course, undesirable because of the additional time and materials needed to carry out such a repair operation.

Many attempts have been made to solve the above recited and other problems which have arisen in the development of submerged arc welding with strip electrodes. However, as the width of the strips used increased, the weld bead surface and the edges of the weld beads deteriorated substantially. As a result, it was impossible to obtain a high quality flawless clad surface since there were noticeable valleys or recesses and slag inclusions occuring at the transition or tie-in point between adjacent weld beads.

The following United States Patents are representative of patents directed towards improving the quality of the resultant cladding in a submerged arc strip cladding process. U.S. Pat. No. 3,584,181 "Method of Arc Welding for Hard Facing" of Nemoto et al; U.S. Pat. No. 3,659,075 "Magnetic Control of Arc in Strip Plating" to pellkoffer; and U.S. Pat. No. 3,882,298 "Method of and Apparatus for the Submerged Arc Surfacing of Metallic Work Pieces" to Neff et al. The Nemoto patent is directed towards eliminating the malignant effect of the circular magnetic field around the strip electrode caused by the welding current and involves the imposition of a magnetic field through the strip electrode and the work piece in the direction from the electrode to the work. Pellkoffer provides means between the work piece and the electrode strip for creating a magnetic field having a plane of maximum magnetic force passing through the work piece at a point in the plating zone for imposing a lateral force on the electric arc to move the electric arc across the work piece. Neff et al provides for electro-magnetic means producing a stationary magnetic field and having a pair of poles of opposite polarity operatively mounted at opposite sides of the electrode strip. It has been found, however, that even making use of all of the suggested prior art techniques for improving deposition rate and weld bead quality that the weld beads deposited still suffered from non-uniformities, inclusions and problems in achieving a sound tie-in of adjacent weld beads. It is towards eliminating these significant problems that the present invention is directed.

Summary of the Invention

The present invention relates to a means for assuring an adequate, continuous flow of welding flux material to the leading side of the strip electrode in a submerged arc weld cladding apparatus. It has been found that with continuous operation of such weld cladding apparatus a barrier of fused flux particles forms on the leading edge of the electrode strip which could impede the flow of welding flux material to the region of the electric arc and thereby permit the arc to flash through the flux covering resulting in defects in the deposited cladding material. According to the invention, means are arranged on the leading side of the electrode strip adjacent the arc zone for breaking up the collection of molten flux material which forms with continuous use of the weld cladding apparatus. In a preferred embodiment, this means comprises a plurality of spaced parallel plates supported adjacent the lower end of the electrode strip in a direction perpendicular to the surface of the strip.

BRIEF DESCRIPTION OF THE DRAWINGS

FIG. 2 is a view looking at the apparatus from the trailing side of the electrode strip and FIG. 3 is a plan view of this arrangement;

DESCRIPTION OF THE PREFERRED EMBODIMENT

Figure 1:
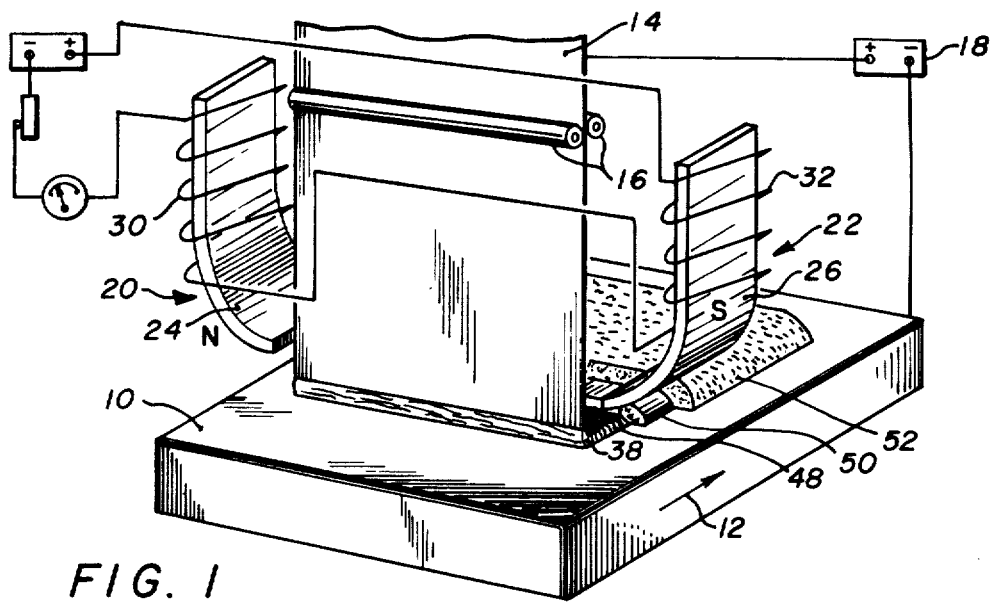
FIG. 1 is a simplified fragmentary view in perspective of an illustrative embodiment of cladding apparatus in accordance with the invention, the leading and trailing flux guides and the slag breaker being omitted therefrom for purposes of clarity, and some of the appurtenant devices employed therewith being shown schematically.
Figure 3:
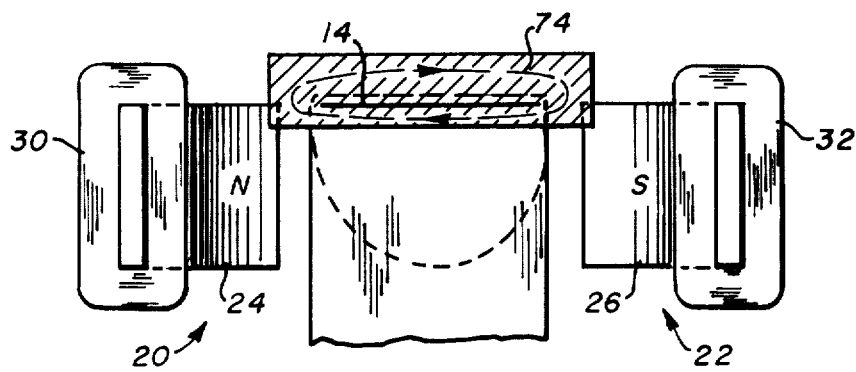
FIGS. 2 and 3 are simplified views of the cladding apparatus showing the relative positioning of the electro-magnetic pole pieces with respect to the consumable electrode strip, adjacent weld bead, and the pool of molten metal/flux.
Figure 2:
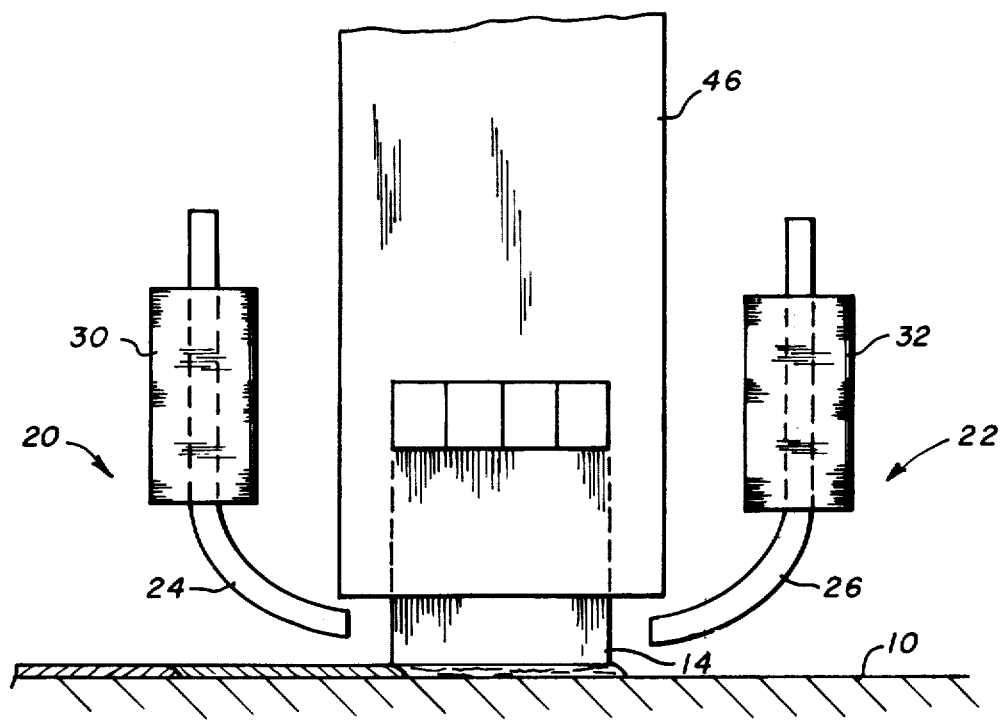

Referring now to the drawings, FIGS. 1, 2 and 3 showing in varying degrees of detail a strip cladding apparatus according to the invention. In each of these views the trailing and leading flux guides are not shown so as to enable a better showing of the position of the electromagnets relative to the work piece and the electrode strip. Referring now to these figures, a work piece 10 which is to be plated, and which may be the interior wall of a cylindrical ferritic steel pressure vessel, is mounted for movement by a traversing or rotating means (not shown) in the direction of the arrow 12 when the apparatus is in operation. A strip 14, for example, a corrosion resistant alloy such as type 308 stainless steel, is provided as the cladding material and is mounted by suitable means, not shown, above the work piece 10. The strip 14 may be moved continuously downwards towards the work piece 10 by a pair of feed rolls 16. The strip 14 is connected to the positive pole of a welding rectifier 18 of which the negative pole is connected to the work piece 10. For purposes of describing the positioning of the electro-magnets and other features of the apparatus, the side of the electrode strip 14 which faces in the direction of movement of the work piece 10, indicated by the arrow 12, will hereinafter be referred to as the trailing side of the strip. Similarly, the side of the strip facing away from the direction of movement of the work piece will hereinafter be referred to as the leading side of the strip. A pair of electro-magnets 20, 22 are arranged behind the trailing side of the electrode strip and adjacent opposing edges of the strip so that the pole faces of the electro-magnets 20, 22 are immediately adjacent the region of molten metal and melted flux resulting from the welding operation as will be hereinafter described in further detail. Each of the electro-magnets 20, 22 comprises an iron core piece 24, 26 respectively which extends vertically downward and bends through a 90° turn so that the opposing pole faces are facing towards one another at a position just above the work piece surface.

Figure 4:
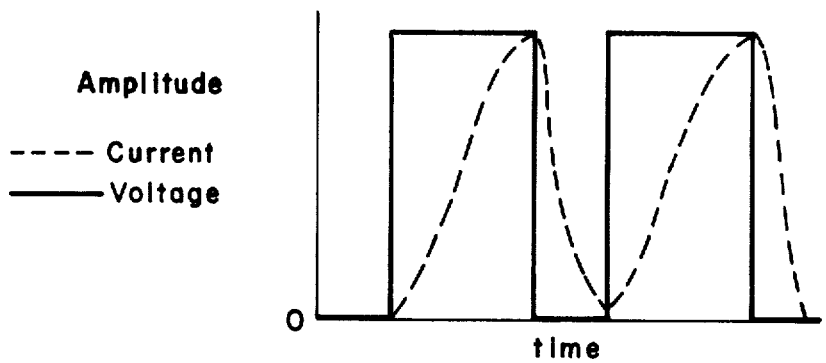
FIG. 4 graphically illustrates a preferred voltage waveform to be delivered to the electro-magnetic coils according to the invention and also the current waveform resulting from such voltage input.

The positioning of the electro-magnetic poles is shown in detail in FIGS. 2 and 3 for an illustrative embodiment of the invention wherein a 4-inch wide strip electrode 14 is used and wherein the resultant deposited cladding material 28 is of a thickness of approximately 3/16 inch. In these Figures, the magnetic pole 20, which is positioned above an adjacent weld bead 28, is a north pole and the lower edge thereof is positioned approximately ¾ inch from the surface of the work piece 10 and the pole face is approximately ¼ inch from the edge of the electrode strip. The south pole 22 is also positioned about ¾ inch from the edge of the electrode strip and its height above the work piece is slightly less, about ⅝ inch. This slight difference in the height of the pole faces helps to overcome slight irregularities in the magnetic field due to the slightly different conditions which exist on the side of the strip which is to be tied in to the previous weld bead. Each of the iron core pieces 24, 26 of the electro-magnets is provided with a coil 30, 32 possessing a suitable number of windings through which the magnetizing current which originates from a direct current source is passed. These windings are in the opposite direction on the two cores 24, 26 so that the flow of the magnetizing current through them creates the desired poles of opposite polarity. In the preferred embodiment, the voltage directed to the coils is a pulsating square wave voltage as shown generally in FIG. 4. Also as seen in FIG. 4, the resulting current from this voltage wave form builds up to a maximum level and then decays to a minimum level preferably slightly greater than zero at which time it again begins to build up. The beneficial results of the resulting pulsating magnetic field will be described in considerable detail hereinbelow.

Figure 7:
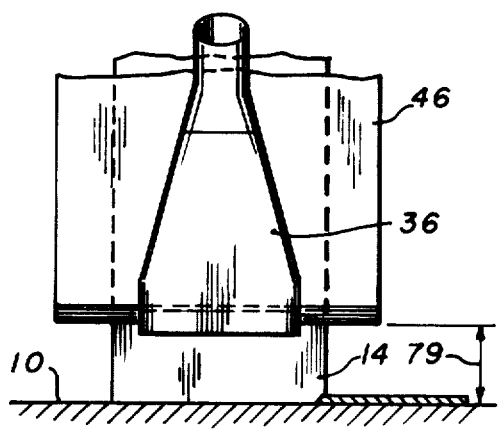
FIG. 7 is a view from the leading side of the apparatus showing the relative position of the leading flux chute.
Figure 8:
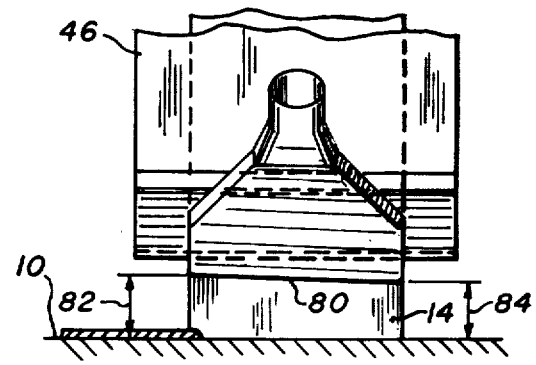
FIG. 8 is a view similar to FIG. 6 taken from the trailing side of the apparatus showing the relative position of the trailing flux chute.
Figure 6:
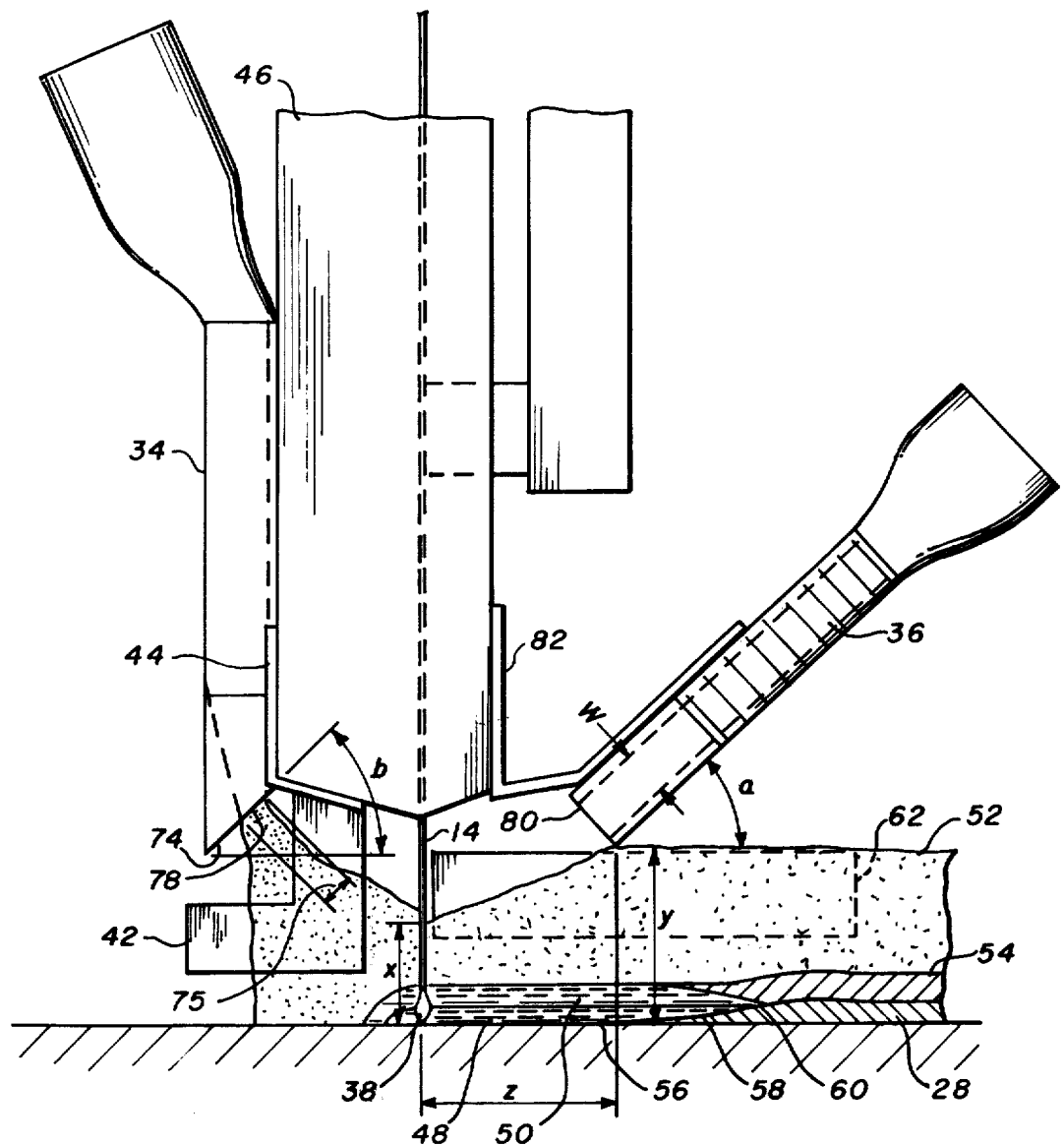
FIG. 6 is a side view of the cladding apparatus showing the positioning of the leading and trailing flux delivery chutes with respect to the electrode strip, the work surface, the deposited cladding material, and the flux material.

Referring to FIGS. 6, 7 and 8, it is seen that the apparatus is provided with leading and trailing flux delivery chutes 34, 36 respectively for delivering a granular welding flux to the region of the electric arc 38. The positioning of these flux chutes, particularly the trailing flux chute 36 is extremely critical in order to obtain a weld bead of the desired high quality. The parameters and other factors which go into determining the precise location of the flux chutes will be described in more detail below.

Figure 10:
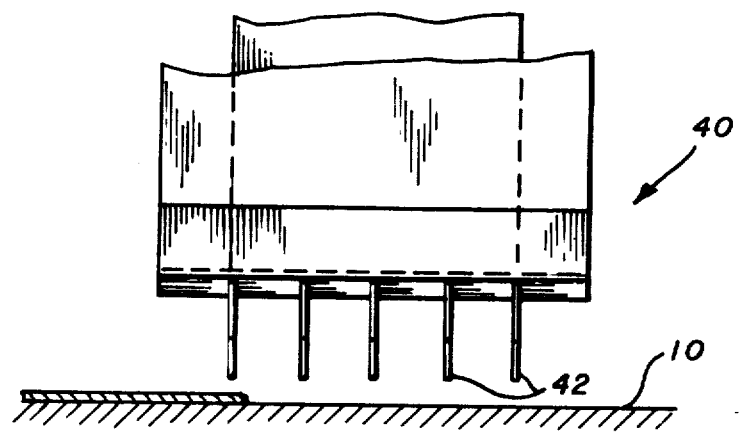
FIG. 10 is a view of the slag breaker from the leading side of the electrode strip.

As best shown in FIGS. 6 and 10 a slag breaker assembly 40 is mounted below the leading flux chute 34. The slag breaker comprises a series of spaced parallel plates 42 supported perpendicular to the electrode strip and extending at least the width of the strip. In the illustrated embodiment these plates comprise right angle plates suitably attached, as by welding to a support bracket 44 which in turn is attached to the weld bead housing 46. The outside corner of the right angle plates is positioned approximately ⅜ inch from both the work piece surface and the leading face of the electrode strip 14. As with the flux chutes the functional advantages of the slag breaker arrangement will be described below in connection with the weld cladding operation.

In operation a direct current voltage is applied between the work piece 10 and the strip 14 by the welding rectifier 18, and an arc 38 is established between these two components. The arc causes the bottom edge of the strip 14 to melt and the molten material is deposited in a generally linear cladding zone on the work piece on the trailing side of the electrode strip to form the weld bead 28 on the work piece. It should be noted that the deposited weld material comprises a molten pool 48 of weld material in the region immediately behind the trailing side of the electrode strip. The molten metal pool is covered by a layer of molten slag (melted flux) 50 which is covered in turn by a layer 52 of unmelted welding flux. The molten slag, of course, solidified to form a solid slag layer 54 on the deposited weld bead at some distance behind the trailing side of the electrode strip. Referring to FIG. 6, the relationship of these various regions for a particular application wherein a 4-inch wide 0.025 thick strip is being used to deposit at approximately 3/16 inch weld bead upon a work piece surface is illustrated in detail. Referring to this detail, it is seen that molten metal pool 48 extends slightly on the lead side of the electrode strip 14 and extends to the trailing side of the strip a distance of approximately ¾ inch (to point 56) wherein solidification begins to occur and the line 58 between the molten and solid metal extends upwardly and terminates at a point 60 approximately 2½ inches behind the trailing side of the electrode strip 14. The pool of molten slag 50 overlying the molten metal pool similarly extends slightly to the leading side of the electrode strip and extends to the trailing side wherein it begins to solidify and form the layer of solid slag 54, the transition to solid slag being essentially complete at approximately the same point 60 at which the molten metal pool has completely solidified. As is seen in the drawing in somewhat exaggerated fashion the thickness of the solidified weld bead 28 with the solid slag 54 thereon is somewhat greater than the thickness of the same constituents in the molten state due to their expansion upon solidification. During the weld cladding melt off process, the strip electrode 14 is continuously fed downwardly toward the work piece 10 by the feed roll 16 to provide a continuous source of cladding material.

Figure 5A:
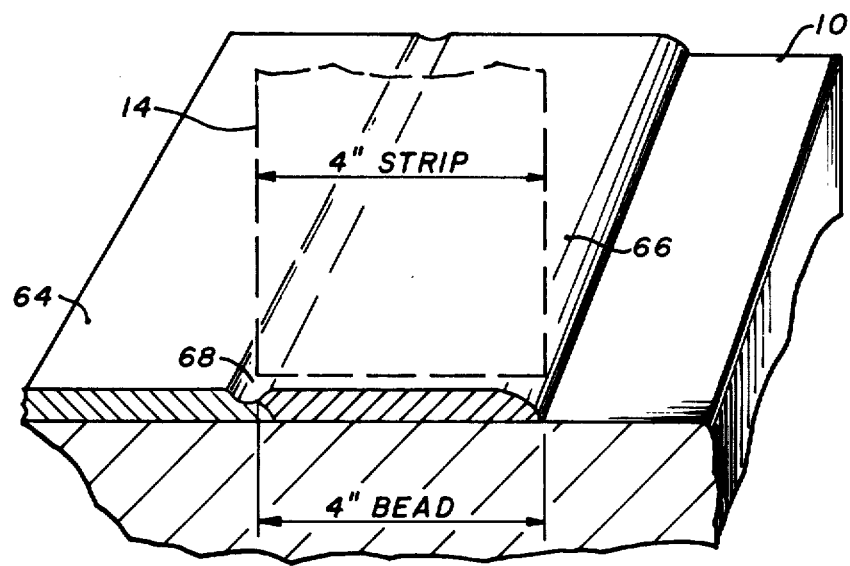
FIG. 5a illustrates the result when a weld bead is deposited in overlapping fashion with an adjacent bead with the apparatus of the invention with the electro-magnets inoperative.
Figure 5B:
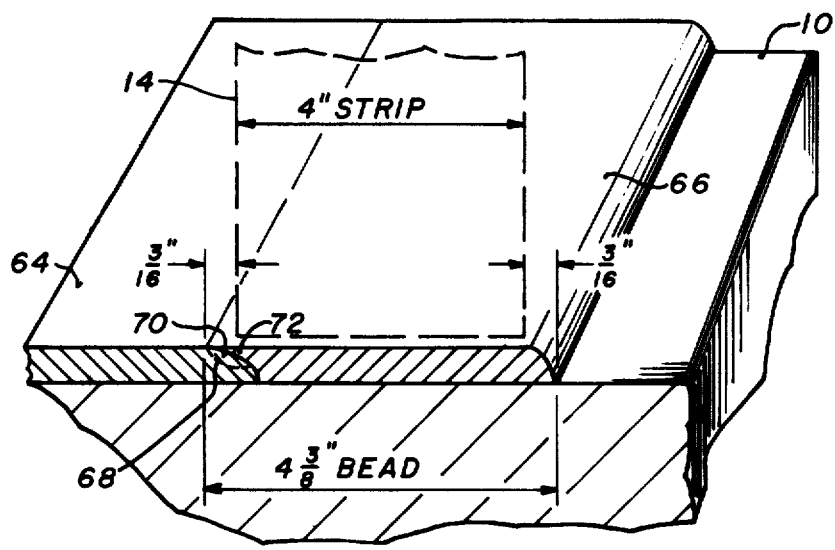
FIG. 5b is similar to 5a showing the results with the electro-magnets in operation.

During the cladding operation a current flow is caused to pass through the coils 30, 32 of the electro-magnetic pole pieces 20, 22. The current inducing voltage, preferably is a square wave pulsed input such as is illustrated in FIG. 4, however, other pulsating inputs such as a sawtooth wave form may be used with acceptable results. The position of the magnetic pole faces with respect to the electrode strip and deposited material is as was described above in connection with FIGS. 1, 2 and 3 and also is shown in outline form 62 on FIG. 6. A part of the magnetic flux lines passing from the north pole 20 to the south pole 22 will extend downward into the region of the molten slag 50, molten weld deposit 48 and base metal 10. These flux lines create a force in the molten slag 50 and molten weld deposit 48 which cause an agitation in this region. This agitation comprises a back and forth motion, the frequency of which is dependent upon the pulsing frequency of the voltage to the electro-magnetic poles; a representative frequency being approximately two cycles per second. The precise frequency which will produce optimum results for any particular application being best determined through experimentation. It should be pointed out here that the primary effect of the magnetic flux lines in the region of the molten metal pool 48 sometimes referred to as the weld crater area, is upon the layer of molten welding flux 50 which possesses magnetic properties when in the molten state. Suitable fluxes of this type are commercially available and such will not be disclosed in detail in this application. Accordingly, it is primarily the back and forth motion of the molten flux pool 50 upon the molten metal 48 which causes, in turn, agitation of the upper surface of the molten metal pool 48. The beneficial effects of the operation of the electro-magnetic system arranged in this position behind the trailing side of the electrode strip 14 will be best appreciated with reference to FIGS. 5a, and 5b, wherein FIG. 5a shows the result when a weld bead is laid down in overlapping fashion with an adjacent bead with the apparatus of this invention with the electro-magnets 20, 22 inoperative. FIG. 5b shows the results of the same operation with the electro-magnets in operation. Referring now to FIG. 5a, the first weld bead 64 has been deposited upon the work piece 10, and the electrode strip, in the illustration a 4-inch strip, was positioned for deposition of the second overlapping weld bead 66 with strip edge overlapping the edge of the first weld bead 64 by approximately ¼ inch. Looking now at the second weld bead 66, again, which was deposited with the electro-magnets inoperative, it is seen that this bead is no greater than 4 inches wide and that the region of the tie-in between the two adjacent beads 64, 66 comprises an elongated crater 68 extending the full length of the tie-in zone. This crater, it is believed, is caused by a flare out of the welding arc from the edge of the strip when it is melting off the electrode strip in the region of the tie-in. This crater would occur regardless of the amount of overlap of the electrode strip 14 with the first weld bead 64. Accordingly, in order to achieve a uniform thickness weld deposit on the work piece shown in FIG. 5a it would be necessary to go back and deposit a reinforcing weld bead in the elongated crater 68.

In FIG. 5b the electrode strip 14 is again oriented, prior to melting off, with an overlap of approximately ¼ inch on the edge of the first weld bead 64. As described above, the tendency of the welding arc to flare out beyond the edge of the strip creates a crater 68 in the edge region of the first weld bead 64. However, with the electro-magnet system in operation, the back and forth agitation of the molten flux, and the resultant motion of the molten metal pool causes a quantity of the molten metal to flow into the crater formed by the arc and to refill this area with weld material 70. The overall width of the resultant weld bead in this example is 4⅜ inch with an equal width of 3/16 inch extending beyond the edge of the electrode strip 14 on either side. As can be seen from this figure, the tie-in between adjacent beads comprises an overlap 72 which may be even slightly greater in thickness than the nominal thickness of the weld clad deposit in the central region of the weld bead. Such reinforcement of the overlap at the tie-in may be controlled by changing the positioning of and/or the strength of the electro-magnets. In addition to the elimination of the undercutting or crater effect at the weld bead overlap, the back and forth motion of the surface material in the molten metal pool results in a very uniform high quality weld bead surface.

A further beneficial effect of the electro-magnet arrangement disclosed herein is the cancellation of undesirable effects due to the circular magnetic field around the strip electrode which is induced by the welding current passing through the strip electrode to the work piece. The presence of this circular magnetic field was recognized by Nemoto et al U.S. Pat. No. 3,584,181, cited previously above. Referring to FIG. 3, this circular magnetic field is identified by the reference number 74 and is in a clockwise direction about the electrode strip 14. Accordingly, the selection of the north and south poles of the electro-magnets 20 and 22 as shown in this illustrative embodiment results in the magnetic flux lines from the poles running from the north to the south pole in a direction opposite to the flux liner of the circular magnetic field present on the trailing side of the electrode strip thus cancelling out the undesirable effects of this field in the region of molten metal. In order to assure full benefit of the field imparted by the electro-magnets, in the preferred embodiment all major components of the weld head in the area of the magnetic field should be made from a non-magnetic material.

Referring now to FIGS. 6, 7, and 8 the method of delivering the granular flux material to the region of the strip burn off and molten metal will be described. The positioning of the leading flux chute 34 is not critical. The purpose of this chute is to permit delivery of a sufficient quantity of flux to the leading side of the strip 14 to assure complete submergence of the arc 38 at all times. In the preferred embodiment shown in the drawings this chute comprises a nozzle type opening 78 about three inches long and 5/16 inch wide. This opening is oriented approximately an inch and one half from the surface of the work piece 10 and approximately an inch and one quarter from the electrode strip 14, and emerges from a face plate 74 oriented at about a 45° angle ($b$) so as to direct the flux passing therefrom toward the arc 38.

Turning now to the trailing flux chute 36, the positioning of this chute is extremely important for controlling the flux burden in the region of the molten metal pool on the trailing side of the electrode strip 14. The trailing flux chute 36 comprises a nozzle type assembly having an elongated rectangular opening 80 approximately 5/16 inch wide and 4 inches in length. This nozzle is mounted to the weld head housing 46 through a suitable bracket 82 such that the angle of delivery from the nozzle is at an angle ($a$) with the horizontal and with the lower edge of the rectangular nozzle opening positioned at dimensions as defined by the laters "$z$" and "$y$" in FIG. 6. Referring still to FIG. 6 it is seen that the level of welding flux delivered by the trailing flux nozzle 36 increases from a first depth "$x$" directly behind the electrode strip 14 in a generally linear fashion to a second depth "$y$" at the lower edge of the flux delivery chute 36. This increase in flux depth occurs along the distance "$z$" measured from the electrode strip 14 to the lower edge of the nozzle. This distance "$z$" is selected such that the greater part of the molten metal pool 48 is included in the region between the electrode strip and that point to which the dimension "$z$" extends. In the example shown, using a 4-inch strip the point at which the molten pool terminates, 60, is approximately 2½ inches from the electrode strip 14 and the dimension "$z$" is approximately 1⅜ inches from the back side of the strip. The angle "$a$" at which the trailing flux delivery chute is oriented with respect to the horizontal is approximately 43° in the illustrated embodiment. It should be appreciated that this angle as well as the dimension "$w$" representing the width of the flux chute opening and $x$, $y$ and $z$ may vary for differing applications, i.e., different strip widths, different desired cladding thickness, different flux density, etc. The important point is the much improved uniformity of bead thickness which is achieved as a result of the lower flux burden in the region of maximum molten material adjacent the electrode strip, and the increasing flux burden as the thickness of molten metal decreases.

In addition to the increasing depth of flux over the region of molten weld metal it will be seen, referring to FIG. 8, that the trailing flux chute 36 is configured such that the outlet nozzle 80 is somewhat higher on the side adjacent a previously deposited weld bead. Such an arrangement tends to provide a flux burden in the region of adjacent weld bean tie-in which produces optimum results. In the illustrated embodiment the dimension 82 is approximately 1¼ inch and the dimension 84 on the other side of the trailing flux chute is approximately 1⅛ inch.

Figure 9A:
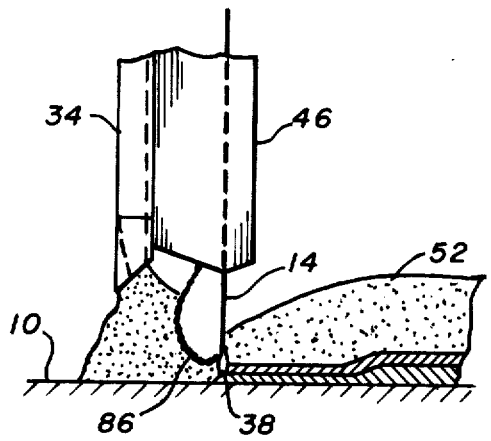
FIGS. 9a and 9b illustrate somewhat schematically the conditions existing adjacent the welding arc at the end of the electrode strip after the apparatus has been in continuous operation for a length of time, FIG. 8a representing conditions without the slag breaker installed and FIG. 8b illustrating conditions with the slag breaker installed in its proper position.
Figure 9B:
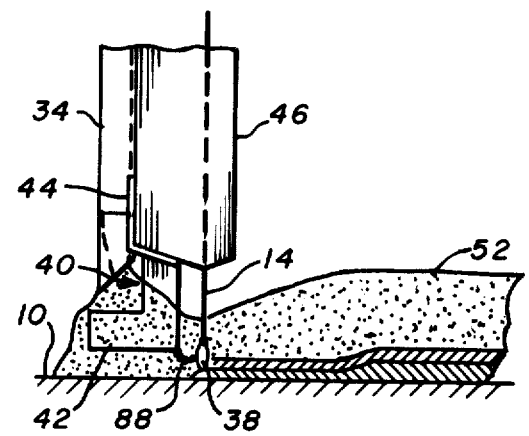

FIG. 9a shows conditions which would exist in the region of the electric arc following long term continuous use of the apparatus as is typical of a production run. In this view of slag formation 86 of fused flux particles approximately 1/32 to 1/16 of an inch thick has formed a sheet on the leading side of the electric arc/electrode strip. This sheet which may extend substantially across the entire width of the electrode strip 14 will block the flux feed into the region of the welding arc 38 on the lead side and result in flashing of the welding arc from beneath the layer of flux material and result in unacceptable performance of the apparatus. FIG. 9b shows the same region of the apparatus similarly following an extended period of continuous use. In this instance the slag breaker assembly 40 is installed and it is seen that the breaker has served to prohibit the formation of the sheet 86 shown in FIG. 9 limiting the accumulation to a small section 88. With the breaker installed the fused flux particles originating from the region near the lower end of the electrode strip are not permitted to form the barrier or blocking sheet and thus flux is permitted to flow freely into the region on the leading side of the strip 14 and maintains the arc 38 submerged in the granular flux material. As a result the weld cladding of the base material may be carried out in a continuous, high speed manner without the necessity to interrupt operation to manually remove accumulated fused flux particles from the leading side of the electrode strip.

PRACTICAL EXAMPLE

A one layer weld cladding was deposited on a steel base cylinder according to the principles of the invention using a type 308 stainless steel, 4 inch wide and 0.025 inch thick strip electrode. The work piece was translated at approximately 10 inches per minute and with a welding current of 2200 A at a voltage of 27 V.D.C. the strip electrode burnoff rate was 72 inches per minute. The deposited bead was 4⅜ inches wide × 3/16 inch thick.

The input to the electro-magnet coils was a pulsed square wave of 16 V.D.C. at 2 cycles per second with the resultant magnetizing current peaking at 8 amps.

The position of the electro-magnets, leading and trailing flux chutes and the slag breaker were substantially as shown in the drawings. It should be evident, however, that while these preferred embodiments of the invention have been shown and described, it will be understood that they are merely illustrative and that changes may be made without departing from the scope of the invention as claimed.

What is claimed is:

1. In combination with weld cladding apparatus for cladding a workpiece to be plated, a plating material strip mounted above said workpiece, and means for creating an electric arc between said workpiece and said strip to melt said strip and to deposit a plating layer on said workpiece to one side of said strip in a generally linear plating zone and wherein means are provided for submerging said arc welding zone in a layer of welding flux material, the improvement which comprises means disposed adjacent said electric arc on the other side of said plating strip for breaking up an accumulation of slag material which forms with continued use on said other side of said plating strip, said slag accumulation, if permitted to form, being capable of blocking the flux feed into the welding arc on said other side of said electrode strip.

2. The combination recited in claim 1 wherein said means for breaking slag comprise a plurality of spaced parallel plate means supported adjacent the lower end of said electrode strip in a direction perpendicular to the surface of said strip.

3. The apparatus of claim 2 wherein each of said plate means comprises a right angle plate supported with one leg substantially parallel to the surface of said electrode strip, the other leg thereof extending outwardly perpendicular to said electrode strip whereby the outside corner of said right angle plate is directed toward said electric arc.

* * * * *